Patented Apr. 1, 1947

2,418,293

UNITED STATES PATENT OFFICE 2,418,293

PROCESSING THERMOPLASTIC RESINS FROM CELLULOSE AND ROSIN ACIDS

Eduard Färber, New Haven, Conn., assignor to Polyxor Chemical Co., Inc., a corporation of New Jersey No Drawing. Application December 6, 1943, Serial No. 513,187

3 Claims. (Cl. 260—9)

Certain resins have been produced by causing cellulose, cellulose containing materials, pentosans, pentosan containing materials or mixtures of these (with which lignin may or may not be present as an additional material), to react with those acids and/or acidic materials which constitute the major parts of rosin (colophony) and tall oil. The method of producing such resins comprises heating to a temperature of at least 300° C. a mixture of a cellulose containing material with a material selected from the group consisting of (1) the resin acids that are found in tall oil, (2) the mixtures of such acids and the fatty acids that are found in tall oil, and (3) rosin, the quantity of said acid materials being at least about equal by weight to the quantity of the cellulose containing material, as described in United States Patent 2,312,807 and 2,343,215. These resins have various desirable characteristics, and generally speaking they are thermoplastic; that is to say, they soften and liquefy at elevated temperatures, and remain liquid above their melting points even after prolonged heating, and after cooling and solidifying they can be remelted again repeatedly. For conciseness hereafter, I refer to these thermoplastic resins as the "resins indicated" or as the "thermoplastic cellulosic resins"; it is to be understood not only that both these terms include only the thermoplastic resins identified above, but also that each of these terms includes all the thermoplastic resins identified above, that is to say each includes resins of this class made from a pentosan or a pentosan-containing material (with or without lignin but without cellulose) as well as resins of the class made from cellulose or cellulose-containing materials (with or without a pentosan and with or without lignin).

I have discovered that the melting points of the resins indicated can be raised materially above their initial values, and at the same time their solubilities reduced considerably from their initial values, without destroying desirable characteristics of these resins. I have discovered also that these resins indicated can be converted into thermosetting resins, and as desired into infusible, substantially insoluble solids, again without destroying their desirable characteristics; in this latter case their melting points are raised to such an extent, as it were, that the resins become infusible to all practical intents and purposes, and herein I use the phrase "raising the melting point" as including producing the infusible state except as the contrary appears.

Speaking generally, my method consists of mixing the resins with relatively small amounts of hexamethylenetetramine. A reaction follows at all ordinary temperatures, although rather slowly with some of the agents, and instead of mixing at room temperatures heat may be applied to speed the reaction, or to increase the effect.

I am aware that hexamethylenetetramine has been used heretofore as a hardening agent for thermosetting resins; that is to say, to increase the hardness of, for example, phenolic resins which, at elevated temperatures, solidify into more or less infusible masses regardless of the presence or absence of the hexamethylenetetramine. The action of hexamethylenetetramine on the resins indicated however (as well as the actions of the other agents named above) is quite different from the action of hexamethylenetetramine on the thermosetting resins. In the case of the latter or phenolic resins, the reagent acts solely to increase the hardness of the ultimate infusible form of the resin. In the case of the resins indicated, the agent constitutes a means, I have discovered, whereby the solubilities of those resins can be reduced, their melting points raised, and (under proper conditions) the resin transformed from a thermoplastic to a thermosetting resin, all without destroying characteristics which make the resins indicated desirable.

Speaking generally, a very small quantity of the agent is sufficient for the present purposes. When using hexamethylenetetramine, from about two-tenths of one part to about two parts of it to one hundred parts of the resin is sufficient. The foregoing and all other proportions mentioned herein are by weight. The particular proportions to be used in any instance depend on the result to be achieved, and to a certain extent on the kind or grade of resin employed; the effects of different proportions vary considerably as appears hereafter.

To illustrate the actions of the various agents, I shall describe various applications of them to the resin made by heating a mixture of one part of waste paper in finely divided form, one part of rosin, and one-half part of tall oil to a temperature of over 300° C., say to about 360° C., while allowing the volatile matters to evaporate and be discharged from the mixture. After the completion of the reaction and the removal of the non-resinous part of the residue, the end product is about one and four-tenths parts of resin which has a melting point of approximately 120° C., and which is completely fluid at about 150° C. and higher temperatures. This resin can be kept at high temperatures, say 200° C., for days without solidifying and without greatly changing its melting point from approximately 120° C. It is to be understood that this resin is used here as representative of all the resins indicated; that is to say, it is referred to herein simply as one example of the class of resins to which my present discovery is applicable.

*Example 1.*—Take one hundred parts of the resin mentioned above, melt it, and thoroughly mix with it two-tenths part of hexamethylenetetramine, and hold the mixture at from 160° C. to 180° C. for thirty minutes. On cooling it will be found that the melting point of the resin is noticeably higher than before.

*Example 2.*—Take one hundred parts of the same resin, melt it, mix with it four-tenths part of hexamethylenetetramine, and hold the mixture at about 175° C. for about ten minutes. By the end of that time the fluid will have become noticeably more viscous, and on cooling the resin will be found to have a melting point noticeably higher than the melting point of the product of Example 1. If the mixture of this Example 2 is held at the same temperature, namely, at about 175° C., for about fifteen minutes, and then cooled until solidified and then again heated, it will be found that the first softening point of the resin is now about 145° C. If the same mixture is held at this temperature, namely at about 175° C., for periods longer than fifteen minutes, it will be found that the melting point of the resin rises as the period of the heating is lengthened until the melting point reaches about 150° C.

The solubilities of the resin decrease as the melting point rises. For example, before the addition of the hexamethylenetetramine the resin dissolves easily in aromatic hydrocarbons of low boiling points. When however the melting point has been raised to about 145° C. by the procedure above, solution of the resin requires larger amounts of the same solvents, and when the melting point has been raised to above about 145° C., the resin cannot be completely dissolved in those solvents, but only in solvents having higher boiling points.

*Example 3.*—With the same materials, proportions and procedure as in Example 2, but holding the mixture at from about 195° C. to about 200° C., the rise in the melting point is achieved in from about two to about five minutes.

*Example 4.*—Using the same materials, temperatures and procedure as in Examples 2 and 3, but using six-tenths part of the hexamethylenetetramine instead of four-tenths part, substantially the same changes are brought about in about half the times mentioned in Examples 2 and 3.

*Example 5.*—Take one hundred parts of the described resin, melt it, and mix with it one part of hexamethylenetetramine at a temperature of about 175° C. The liquid becomes highly viscous at this temperature in a few seconds. On cooling it will be found that the melting point of the resin is now about 170° C. The solubility of this resin is materially less than the solubility following the treatments of the preceding examples.

*Example 6.*—With the same materials, proportions and procedure as in Example 5, except that the mixture is heated to about 200° C., the mass solidifies in about two to three minutes. That is to say, the resin sets at this temperature. It can be remelted however; its melting point is about 210° C. Also the resin in its solid form following this treatment is much harder than the resins of the preceding examples, and dissolves incompletely and only in solvents having high boiling points.

*Example 7.*—With the same materials, proportions and procedure as in Example 5, but heating the mixture to above 200° C., for example to about 210° C., a complete change occurs in about one-half a minute. The resin then solidifies at this temperature and becomes infusible and substantially or quite insoluble.

*Example 8.*—Take one hundred parts of the described resin, melt it, thoroughly mix with it one and two-tenths parts of hexamethylenetetramine, and heat to from about 160° C. to about 170° C. The resin solidifies and becomes infusible, and substantially or quite insoluble, in a few seconds.

It thus appears that the addition to the resins indicated, of hexamethylenetetramine in small quantities, specifically in quantities of from about two-tenths of one per cent to less than two per cent of the resin, by weight, reduces the solubility of those resins, raises their melting points, and in the upper part of the range, and at least with the aid of heat, transforms those thermoplastic resins into thermosetting resins and renders the same quite or substantially insoluble, at least in the commonly encountered solvents. The application of heat hastens the reaction; in longer times however the reaction appears to take place even at ordinary temperatures. The same effect cannot be produced by substituting for the hexamethylenetetramine, formaldehyde in either its monomeric or polymeric forms, or by substituting hydrofurfuramide.

It is to be understood that the maximum quantities of the agents indicated above, are only the maximum quantities required for the complete reactions. Quantities of the agents greater than the maximum indicated above can be used without changing the results, excepting that (as before indicated) under similar conditions greater quantities bring the reaction to an end more quickly than lesser quantities, and for this reason quantities greater than some of those indicated above may make the operations difficult to perform, or even may produce non-homogeneous products due to a rapid rise in the viscosity making it difficult or impossible to mix the components uniformly. Therefore excesses over quantities of the agents indicated above are only unneeded excesses, and are to be regarded as such for the purposes of this specification. Further, plasticizers can be added to the resin either before or simultaneously with the mixing of the resin and agent or agents as described above, or even subsequently in those instances when the infusible form is not achieved immediately. However, additions of plasticizers tend to reduce the speed of the reactions, and may require the use of larger quantities of the agents than specified above to achieve the same results. In effect, addition of the agent or agents may be required to neutralize the plasticizer, and for the purposes of this specification quantities of the agent or agents in excess of the quantities mentioned above, when required because of the use of plasticizers, are to be regarded as used to neutralize the plasticizers. The additional quantity of agent required for such a purpose, can, of course, be found by simple test. The quantities mentioned above and the claims hereafter are to

I claim:
1. The method of changing the qualities of a thermoplastic resin produced by heating to a temperature of at least 300° C. a mixture of a cellulose containing material with a material selected from the group consisting of (1) the resin acids that are found in tall oil, (2) the mixtures of such acids and the fatty acids that are found in tall oil, and (3) rosin, the quantity of said acid materials being at least about equal by weight to the quantity of the cellulose containing substance, which comprises mixing with one hundred parts of the thermoplastic resin, from about two-tenth part to about two parts of hexamethylenetetramine, the proportions being by weight.

2. The method of claim 1, characterized by heating the mixture of the thermoplastic resin and the hexamethylenetetramine to from about 160° C. to about 220° C.

3. The method of claim 1, characterized by the fact that the resin is melted and the hexamethylenetetramine is mixed into the melted resin.

EDUARD FÄRBER.

REFERENCES CITED

The following references are of record in the file of this patent:

UNITED STATES PATENTS

| Number | Name | Date |
|---|---|---|
| 1,801,052 | Meigs | Apr. 14, 1931 |
| 1,801,053 | Meigs | Apr. 14, 1931 |
| 2,286,643 | Phillips | June 16, 1942 |
| 2,303,345 | Mason | Dec. 1, 1942 |

FOREIGN PATENTS

| Number | Country | Date |
|---|---|---|
| 830,863 | French | May 23, 1938 |